Nov. 17, 1936.  E. A. WILLEY ET AL  2,061,053
CEMENTING MACHINE
Filed Jan. 9, 1934   2 Sheets-Sheet 1

Inventors,
Edward F. Casey,
Edward A. Willey,
by Roberts Cushman Woodberry.
Attys.

Nov. 17, 1936. E. A. WILLEY ET AL 2,061,053
CEMENTING MACHINE
Filed Jan. 9, 1934  2 Sheets-Sheet 2
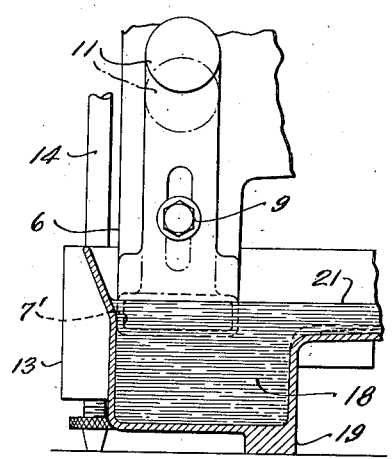
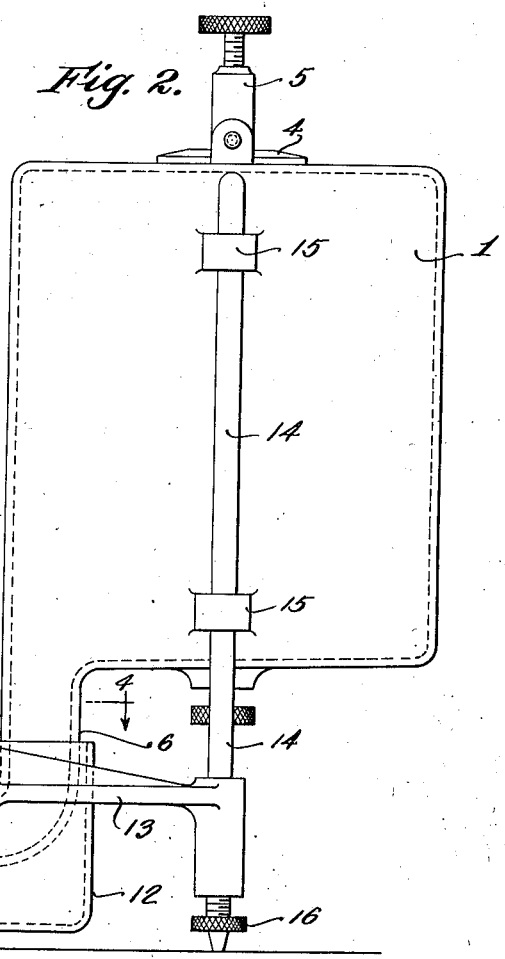
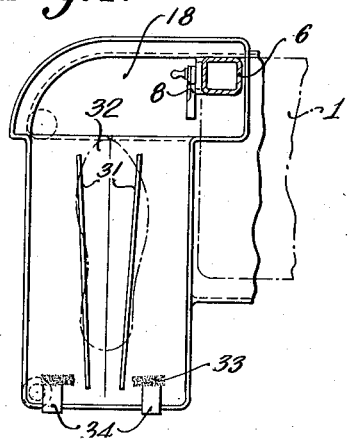
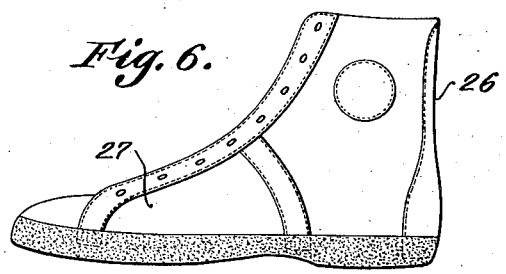
Inventors,
Edward F. Casey,
Edward A. Willey,
by Roberts, Cushman Woodbury
Attys.

Patented Nov. 17, 1936

2,061,053

UNITED STATES PATENT OFFICE 2,061,053

CEMENTING MACHINE

Edward A. Willey and Edward F. Casey, Malden, Mass., assignors to Converse Rubber Company, Malden, Mass., a corporation of Massachusetts Application January 9, 1934, Serial No. 705,886

5 Claims. (Cl. 12—80)

This invention relates to a device for the application of rubber cement or like adhesives to shoes.

In the manufacture of shoes, and more especially of those having soft uppers, such as canvas shoes or sneakers, it is common practice to stretch the upper upon a metal last, insert the inner sole, turn in and fold the lower edges of the upper underneath the inner sole, apply a filler piece, and then coat the exposed surfaces on the bottom of the shoe, as thus lasted, with a relatively thick, viscous cement. This coating of cement serves to hold the parts together, as thus assembled, and also to retain the outer sole of the shoe which is subsequently applied and firmly forced into position or molded onto the shoe under compression. The outer sole may be made of molded vulcanized rubber or of other suitable materials.

In such procedure, it is important that the cement shall cover all of the surfaces which are to be joined to the outer sole. It is equally important,—or in fact, more important,—that the cement shall not extend beyond such areas and wet or contact with surfaces of the upper which are not subsequently to be covered,—as by the outer sole, foxing, toe caps, or the like.

It is accordingly an object of this invention to provide an apparatus which shall be convenient for applying cementitious material to the bottom of a lasted shoe, thoroughly to wet and coat the same, which shall provide means for removing excess of the coating composition and which shall also regulate and definitely control the margin of the coating layer and its relative position on the upper of the shoe. Other objects of the invention will appear from the following disclosure.

The apparatus of the invention includes a tank or chamber for containing a supply of the cement, a trough adjacent thereto, means for delivering the cement to the trough and maintaining a definite, predetermined liquid level of the cement therein. The apparatus also includes the provision of guide or support means, in the trough, for receiving and positioning the bottom of the shoe, in respect of the predetermined liquid level of the cement. The guide or support means are also so devised as to accommodate various sizes of shoes, preferably without necessitating further adjustment of any of the other parts of the apparatus. One end of the trough is conveniently made deeper than the main portion of the trough, which serves both to receive the incoming supply of cement and also as a reservoir of cement, into which the toe of the shoe may be dipped to provide a layer for the application of a toe cap or other special attachments to other parts of the shoe. Leveling means are provided, so as to adjust the level of the liquid cement, with reference to the trough; and wiping means, at one side of the trough, upon which the excess of adhesive, especially when thick cements are being employed, may be scraped off.

A typical and preferred embodiment of my invention will be described with reference to the accompanying drawings, in which:

Fig. 2 is a side view on the line 2—2 of Fig. 1, and showing the shoe in a single position therein, in dotted lines;

Fig. 3 is a front detail view of a modified form of outlet from the supply tank;

Fig. 4 is a plan view of the trough of Figs. 1 and 2;

Fig. 6 is a side view of the cement coated shoe.

Figure 1:
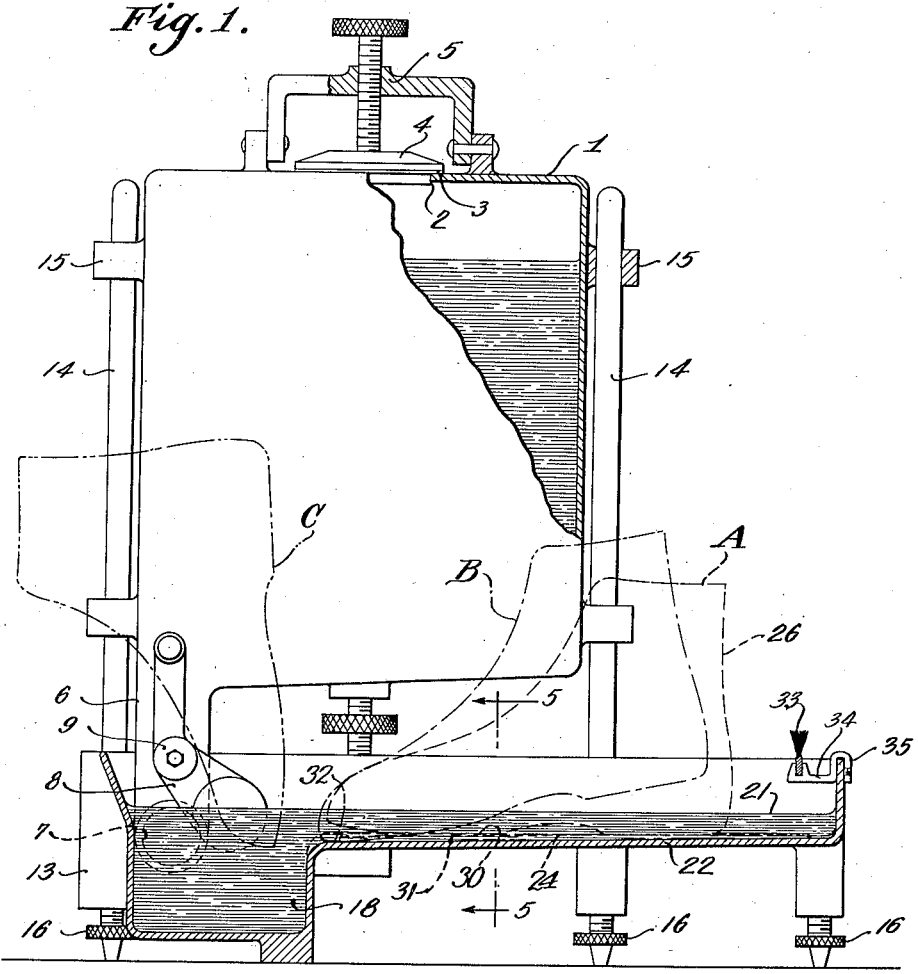
Fig. 1 is a front view and cross-section of the device with part of the supply tank broken away showing a shoe in three positions therein (indicated by dotted lines)

The apparatus illustrated comprises a tank or chamber 1 which may be substantially rectangular, having an opening 2 at the top into which the cement may be charged into the tank and then hermetically closed by a gasket 3, cover 4 and screw-clamping device 5. The tank also has a depending portion or spout 6 at one corner, with a vertical opening 7 (shown as round in Fig. 1 and as square in Fig. 3) which is closed by a swinging closure member 8 which is ground to fit over the opening. The closure may be pivoted to a bolt as at 9 which carries a spring 10 to hold it firmly in closed position. In the modification shown in Fig. 3, the corresponding closure 8 has upper bearing surfaces 11 and may be adapted to slide vertically upon a bolt 9 and held by a spring, in the manner shown in Fig. 2.

The trough portion 12, of the apparatus may be attached in fixed relation to the storage chamber by the arms 13 and rods 14, passing through an opening in said arms and through bosses 15 affixed to the side walls of the chamber and terminating in screw-adjustable supports 16, which may serve, in conjunction with similar screw-adjusted support 17 on the bottom of the trough portion, to adjust and preserve the level of the trough and also of the supply tank 1.

The trough 12 has a relatively deep portion 18, at one end, the lug 19 on the bottom of which may also serve as a permanent rest or support, especially when the trough is to be tipped up for emptying. This deep portion of the trough receives the spout portion 6 of the supply tank, above described, the opening 7 in which is so positioned that the upper edge of the openings stands substantially at the level to which the cement is desired to stand in the trough.

Upon now turning the closure 8 into fully open position, the cement flows out into the trough, air flowing back into the chamber to replace the effluent liquid, until the latter has substantially covered the opening, when such supply of air is cut off by becoming submerged in the liquid in the trough, and the flow of liquid ceases.

At this point the liquid cement fills the depression 18 and also the higher portion of the trough to a horizontal level as indicated at 21. The bottom of the shallow portion of the trough 22 is of a shallow V-shaped contour in transverse cross-section, as shown in Fig. 2, thus making the contained liquid slightly deeper along the channel 23 in the middle than along the sides of the trough. The bottom of the trough also slopes longitudinally from the right side (Fig. 1) downwardly toward the deep portion 18. This slope is gradual and amounts to approximately 1/8" to 1/4" in twelve inches. It is provided primarily to compensate for the downwardly curved portion of the sole portion of the shoe, at the ball of the foot (with respect to the heel portion) which would otherwise hold the forward part of the shoe too high. This sloping bottom also compensates for this tendency, which varies but is encountered, in different sizes of shoes, so that the same trough may be used for cementing various sizes of shoes satisfactorily.

Longitudinally of the trough, and preferably molded on the inside surface of the bottom, is a pair of rails 24, 24 which are approximately 1/4" high and are comparatively close together at the right side or higher end of the trough and diverge from each other (and from the median line or channel 23 of the trough), as shown in the plan view, Fig. 4.

Figure 5:
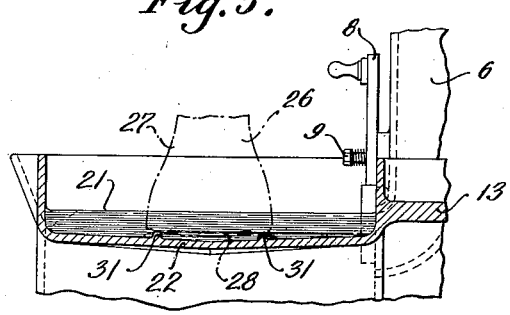
Fig. 5 is a cross-section of the trough and shoe on the line 5—5 of Fig. 1.

As the shoe 26, comprising an upper 27 and inner sole and filler strip 28, which is lasted upon a suitable last (not shown) is set in the trough (see Fig. 1) in position A, the heel portion rests upon the rails at their closely spaced portion or to the right, as shown in Figs. 4 and 5, and the sole or ball portion 30 rests upon the rails at the left or toward their diverging ends. As thus positioned, the cement wets the bottom of the shoe and comes up around the heel and arch portions to the required height and the upper margin of the wetted portion is substantially parallel to the welt portion or what will constitute the outer sole of the finished shoe.

The shoe is now rocked forward onto the ball of the shoe, into position B as indicated in Fig. 1, the sole portion of the shoe 30, still resting upon the rails up to the point at which they spread beyond the shoe, as illustrated at 31 in Fig. 4. At this point the shoe is permitted to dip down until the bottom of the toe portion of the shoe 32 rests upon the bottom of the trough and in the V-shaped channel 23. In this manner the toe portion of the upper is dipped deeper in the cement and the level 21 of the liquid cement, which has already attained the desired height around the heel and arch portions of the shoe and out to the ball portion 30, is extended around the toe portion, slightly higher up than is effected upon first setting the shoe in the trough. The margin of cement around the toe, though raised somewhat in this manner, is nevertheless substantially parallel to the sole or bottom of the shoe in the toe portion, since the toe of the shoe rises appreciably above the plane established by the ball and heel portions.

The shoe is now lifted out of the cement, the very fluid excess allowed to run off, and the residue wiped off by drawing the shoe, from heel to toe, over the brush 33 which is mounted at the right-hand end of the trough by the spring clamp 34, adapted to receive the same and hold it firmly in position and which is mounted upon the wall of the trough by a clamp 35. The surplus cement flows back into the tank. If the brush becomes bent down under the pressure of continued wiping, it may be turned about so that the wiping action comes in the opposite direction. In this way a maximum life of the wiping brush is obtained.

If the shoe is to be provided with a toe cap or a higher strip of foxing about the toe portion than about the rest of the shoe, the cement line will be required to pass across the tip end of the toe. To accomplish this, the shoe will be tipped up to a substantially vertical position, toe down and dipped directly down, as indicated by position C, in Fig. 1, to the required depth. This may be readily and accurately determined by the eye of the operator.

The cement coated shoe is then set in racks and the cement allowed to stiffen slightly, whereupon the outer sole is applied to the cement coated bottom of the shoe, to which it adheres firmly and permanently. A strip of foxing is also applied to the cement coated strip of upper and, in fact, is applied before the outer sole so that the foxing is overlapped by and provides a surface of attachment for the sole, while its upper edge conforms to the upper margin of the cement, over which it may be crimped to form a tight joint.

As the cement is used, the level 21 tends to fall. But as this occurs, and the level falls below the upper part of the opening 7, air is permitted to enter the supply tank and a fresh supply of cement enters the trough, until the opening is again closed thereby. By thus automatically and frequently providing for the introduction of fresh cement, the level of the liquid cement is maintained substantially uniform, and by introducing such additions at the deep end of the trough, surging effects are avoided or prevented.

In the modification of the apparatus shown in Fig. 3, this control is still further improved by providing a relatively wide rectangular opening. In this form, when the fluid level falls below the top of the opening, the differential in pressure of the liquid in the tank and in the trough is effective throughout the width of the opening and tends more promptly to expose the surface tension of the cement to the pressure of the atmosphere and thus permit the penetration of the air through this liquid film and to enter the tank. Thus, more cement is supplied to the trough, before the liquid level in the trough has dropped to an appreciable degree.

By adjusting the closure 8 in this modified form of the apparatus and tightening the nut 9, the upper limit of the opening 7' is fixed and the level of liquid in the trough 12 may be regulated and will be automatically maintained thereafter.

At the end of a day's use, the closure 8 in both modifications may be closed, the cement in the trough thrown away or poured off into a general container for recovery with more solvent, and the apparatus left over night. The composition of the cement contained in the supply tank is maintained since it is hermetically closed. The residue in the trough,—especially of rubber cements, forms a tough film, which may be stripped off, leaving the trough perfectly clean. In the morning, the closure 8 is again opened, and the apparatus is already in condition and the level of the liquid is automatically adjusted for immediate use as soon as the cement has flowed into the trough up to the predetermined level, for which it is adjusted.

We claim:

1. Apparatus for cementing shoes, comprising a supply chamber for the fluid cement, a shallow trough having a sloping bottom, and adjustable means for delivering the cement from the chamber to the trough adjacent to the lowermost portion of the bottom and below the normal fluid surface of the cement, for maintaining the level of the liquid in said trough.

2. Apparatus for cementing shoes, comprising a supply chamber for the fluid cement, a shallow trough having a sloping bottom, means for delivering the cement from the chamber to the trough adjacent to the lowermost portion of the bottom for maintaining the level of the liquid in said trough, and means for adjusting the apparatus to regulate the relationship of the liquid level of the fluid cement to the level of the sloping bottom of the trough.

3. Apparatus for cementing shoes, comprising a supply chamber for the fluid cement, a shallow trough having a sloping bottom and a channel therein adapted to receive the sole of a shoe along the margins thereof, means for delivering the cement from the chamber to the trough, and means for adjusting and maintaining the level of the liquid in said trough.

4. Apparatus for cementing shoes, comprising a supply chamber for the fluid cement, a shallow trough having a sloping bottom, a channel formed therein by a rail on either side of said channel and diverging downwardly thereon, means for delivering the cement from the chamber to the trough, and means for adjusting and maintaining the level of the liquid in said trough.

5. Apparatus for cementing shoes, comprising a shallow trough, having a channel in the bottom formed by a pair of rails disposed on either side of the channel, and adapted to receive a shoe thereon, said rails diverging downwardly.

EDWARD A. WILLEY.
EDWARD F. CASEY.